United States Patent
Lehmann

(10) Patent No.: US 11,636,412 B2
(45) Date of Patent: Apr. 25, 2023

(54) SYSTEM AND METHOD FOR PROGNOSTIC ANALYTICS OF AN ASSET

(71) Applicant: GENERAL ELECTRIC COMPANY, Schenectady, NY (US)

(72) Inventor: Andrew Todd Lehmann, Cincinnati, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 361 days.

(21) Appl. No.: 16/752,586

(22) Filed: Jan. 24, 2020

(65) Prior Publication Data

US 2021/0233000 A1    Jul. 29, 2021

(51) Int. Cl.
*G06Q 10/06* (2012.01)
*G06Q 10/0631* (2023.01)
*G06Q 10/0637* (2023.01)
*G06Q 10/0639* (2023.01)

(52) U.S. Cl.
CPC . *G06Q 10/06313* (2013.01); *G06Q 10/06375* (2013.01); *G06Q 10/06395* (2013.01)

(58) Field of Classification Search
None
See application file for complete search history.

(56) References Cited

U.S. PATENT DOCUMENTS

| | | |
|---|---|---|
| 7,860,618 B2 | 12/2010 | Brandstetter et al. |
| 8,340,948 B1 | 12/2012 | Song et al. |
| 8,868,287 B2 | 10/2014 | Delaye et al. |
| 2005/0043870 A1 | 2/2005 | Joshi et al. |
| 2006/0217993 A1 | 9/2006 | Anderson |
| 2007/0118502 A1 | 5/2007 | Aragones et al. |
| 2008/0172268 A1 | 7/2008 | Wingenter |
| 2009/0096406 A1 | 4/2009 | Flickinger et al. |
| 2010/0052948 A1 | 3/2010 | Vian et al. |

(Continued)

FOREIGN PATENT DOCUMENTS

| | | |
|---|---|---|
| CN | 103020438 A | 4/2013 |
| CN | 113177653 A | 7/2021 |

(Continued)

OTHER PUBLICATIONS

Herzog, James P., et al. "High performance condition monitoring of aircraft engines." Turbo Expo: Power for Land, Sea, and Air. vol. 46997. 2005. (Year: 2005).*

(Continued)

*Primary Examiner* — Thomas L Mansfield
(74) *Attorney, Agent, or Firm* — Wood IP LLC

(57) ABSTRACT

There are provided systems and methods for prognostic analytics of an asset. For example, there is provided a system for monitoring a reliability of a component of an asset. The system includes a processor and a memory comprising instructions that, when executed by the processor, cause it to perform certain operations. These operations may include receiving input data, which can include performance data relating to the component, configuration data relating to the component, and statistical data relating to a plurality of assets. The operations can further include providing a preemptive recommendation for the component based on the input data.

20 Claims, 4 Drawing Sheets

(56) References Cited

U.S. PATENT DOCUMENTS

| | | | |
|---|---|---|---|
| 2010/0262442 A1* | 10/2010 | Wingenter | G06Q 10/04 |
| | | | 705/400 |
| 2012/0290104 A1 | 11/2012 | Holt et al. | |
| 2013/0268501 A1* | 10/2013 | Gorinevsky | G06Q 10/20 |
| | | | 707/693 |
| 2014/0032470 A1 | 1/2014 | McCarthy et al. | |
| 2014/0121885 A1* | 5/2014 | Schoonveld | G06Q 10/10 |
| | | | 701/29.3 |
| 2015/0274312 A1 | 10/2015 | Conrad | |
| 2016/0207639 A1* | 7/2016 | Ellis | B64F 5/60 |
| 2017/0129512 A1 | 5/2017 | Shubs, Jr. et al. | |
| 2017/0323239 A1 | 11/2017 | Johnson et al. | |
| 2017/0323240 A1 | 11/2017 | Johnson et al. | |
| 2017/0323274 A1 | 11/2017 | Johnson et al. | |
| 2017/0357223 A1 | 12/2017 | Jiang et al. | |
| 2019/0146446 A1 | 5/2019 | Abernathy et al. | |
| 2019/0146470 A1* | 5/2019 | Akkaram | G05B 23/0254 |
| | | | 700/30 |
| 2019/0287005 A1 | 9/2019 | Subramaniyan et al. | |
| 2021/0233000 A1* | 7/2021 | Lehmann | G06Q 10/06375 |

FOREIGN PATENT DOCUMENTS

| | | | | |
|---|---|---|---|---|
| EP | 3483800 A1 * | 5/2019 | | G05B 19/0428 |
| GB | 2591854 A | 8/2021 | | |
| WO | WO-2017192998 A1 * | 11/2017 | | G05B 13/041 |

OTHER PUBLICATIONS

Daily, Jim, and Jeff Peterson. "Predictive maintenance: How big data analysis can improve maintenance." Supply chain integration challenges in commercial aerospace. Springer, Cham, 2017. 267-278. (Year: 2017).*

King, S., et al. "Probabilistic approach to the condition monitoring of aerospace engines." Proceedings of the Institution of Mechanical Engineers, PartG: Journal of Aerospace Engineering 223.5 (2009): 533-541. (Year: 2009).*

Ogaji, S. O. T., Pericles Pilidis, and Richard Hales. "TERA—a tool for aero-engine modelling and management." (2007). (Year: 2007).*

GB Examination Report for GB Application No. GB2018735.7 dated Feb. 7, 2023, 10 pages.

* cited by examiner

SYSTEM AND METHOD FOR PROGNOSTIC ANALYTICS OF AN ASSET

TECHNICAL FIELD

The present disclosure relates to work-scoping systems. Particularly, the present disclosure relates to a system and a method for generating and providing prognostic analytics of an asset.

BACKGROUND

Many enterprise applications make use of reliability monitoring systems to forecast part longevity based on usage; as such, managers are able to schedule maintenance or even the decommissioning of parts as well as their replacement. In typical reliability monitoring systems this forecasting is often performed utilizing fleet-based performance data as well as fleet-based statistical models. In other words, these typical systems require data for a large number of assets to provide predictive work-scoping information based on the collective statistical parameters estimated from these data.

Furthermore, while in some industries, a focus is placed on identifying parts that need servicing in order to maximize supplier profits through service contracts, in other industries, the focus is to extend the lifetime of an asset in the field by performing preventative part replacement. The latter paradigm is prevalent, for instance, in military applications where the focus is to maintain operational readiness. For example, the logistical constraints for military jet engines is to extend engine operational lifetimes while minimizing down time. As such, parts are replaced early in order to ensure readiness.

Typical monitoring systems do not perform well when optimizing these constraints for an individual part because they operate based on fleet-wide statistics, which may be inadequate when considering an individual component. As such, for military applications, or for any other enterprise application where reliability requirements on single components is critical to achieve operational objectives, there is a need for reliability monitoring systems that provide predictive and preemptive work-scoping information at the single-component level.

SUMMARY

The present disclosure exemplary embodiments that help solve or mitigate the aforementioned issues. For example, there are provided a system and a method for predictively and preemptively identifying part replacement candidates beyond current technical repair data in an effort to extend in-field time-of-use. For instance, the exemplary system and method may predictively and preemptively identify a specific jet engine part in a fleet of jet engines as a candidate for replacement in order to extend the specific jet engines time-on-wing. The exemplary method and system may make use of individual engine data to characterize both cycles and hours and perform comparative statistical analyses. Furthermore, the exemplary method and system may make use of relative severity factors to shift a fleet's Weibull distribution based on an individual engine. As such, the exemplary embodiments allow prognostic analytics to help in engine refurbishment.

In one embodiment, there is provided a system for monitoring a reliability of a component of an asset. The system includes a processor and a memory comprising instructions that, when executed by the processor, cause it to perform certain operations. These operations may include receiving input data, which can include performance data relating to the component, configuration data relating to the component, and statistical data relating to a plurality of assets. The operation can further include providing a pre-emptive recommendation for the component based on the input data.

In another embodiment, there is provided a system for monitoring a reliability of a subset of assets of a fleet of assets. The system includes a processor and a memory comprising instructions that, when executed by the processor, cause it to perform certain operations. These operations may include receiving input data, which can include performance data relating to a set of components from assets in the subset of assets and configuration data relating to the set of components. Furthermore, the input data may include statistical data relating to the fleet of assets. The operations can further include providing a pre-emptive recommendation for the set of components based on the input data.

In yet another embodiment, there is provided a system for monitoring a reliability of a fleet of assets. The system includes a processor and a memory comprising instructions that, when executed by the processor, cause it to perform certain operations. These operations may include receiving input data, performance data relating the fleet of assets, configuration data relating to the fleet of assets, and statistical data relating to the fleet of assets. Furthermore, the operations may include providing a pre-emptive recommendation for the fleet of assets based on the input data.

Additional features, modes of operations, advantages, and other aspects of various embodiments are described below with reference to the accompanying drawings. It is noted that the present disclosure is not limited to the specific embodiments described herein. These embodiments are presented for illustrative purposes. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

Figure 1:
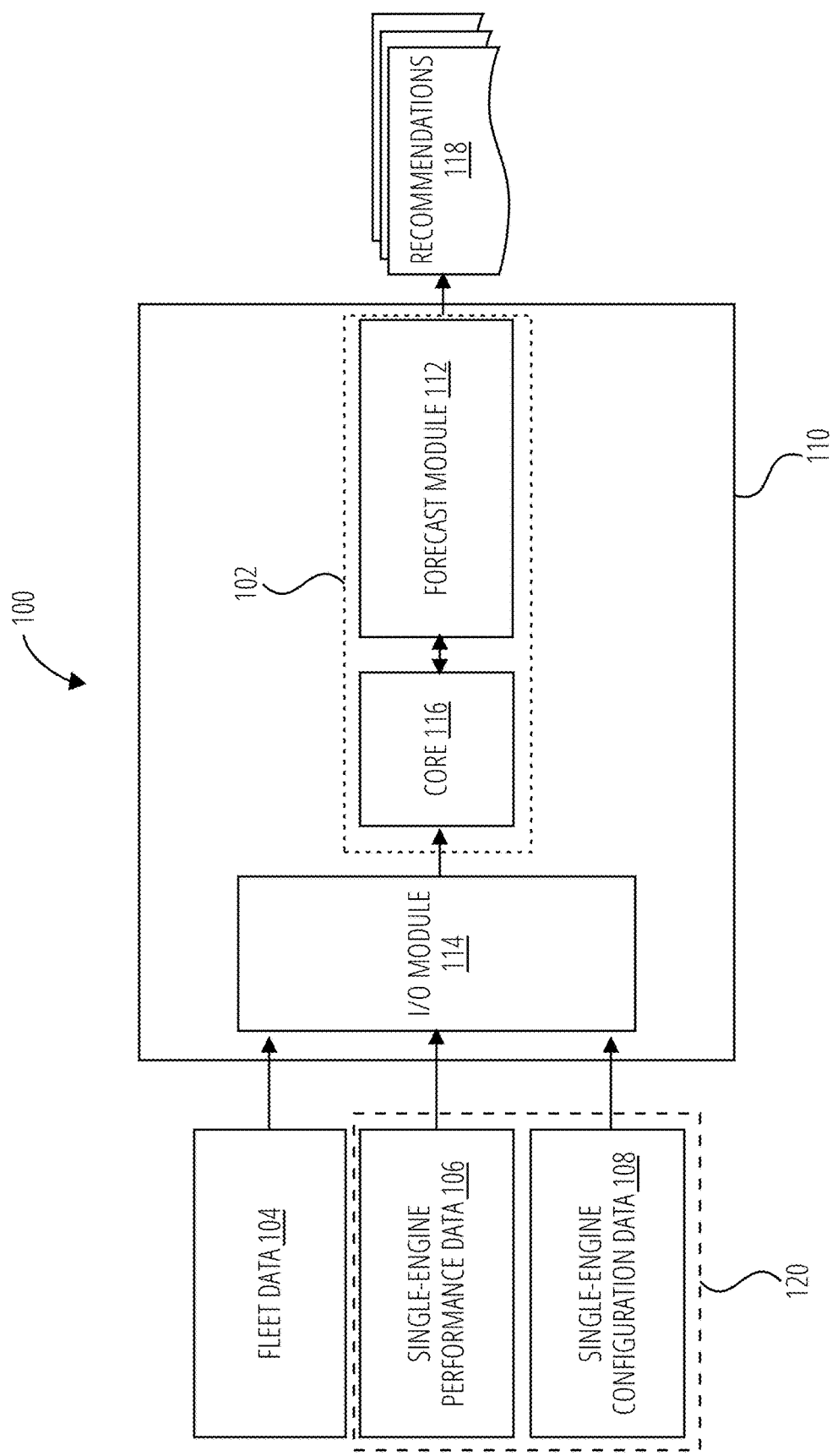
FIG. 1 illustrates a sub-system according to an exemplary embodiment.

Prior to discussing the drawings of the present disclosure at length, several terms and concepts are covered in order to facilitate the detailed description of the exemplary embodiments depicted in the drawings. It is noted that however that these terms and concepts do not limit the disclosure and that one of ordinary skill in the relevant art(s) will readily recognize modifications and changes applicable to the following ancillary systems and/or concepts that do not limit the scope of the present teachings.

One system that may be used with the exemplary embodiments is an engine tracking database system (ETDS). This system serves as the official record of time, cycles, configuration, and maintenance history of a given engine. It is provided to a customer who then maintains its currency through periodic update of records. This system would feed crucial data of configuration, time and cycles on individual components to the main analytics core system.

One metric that may be used in the context of the exemplary embodiments discussed herein is an unscheduled engine removal (UER), it is typically tracked as a rate, which can be, for example, the number of removals per unit of flight hours. The UER rate is often used as a figure of merit for a given prognostic system. This rate is similar to the time on wing, which is the measure of time between engine removals both scheduled and unscheduled. It is noted that UERs are almost always the driver of the time on wing metric.

Another metric is TAC/EFH ratio, which is used to help determine mission length and severity. The numerator, TAC, is the total accumulated cycles, which is a measure of full and partial transients over the life of an engine. The denominator, EFH, is the engine flight hours over the life of the engine. An engine that accumulates many cycles for a fixed amount of flight time often has a net lower exposure to extended high power operation which in turn drives low flight severity and lower accumulated distress in the engine flow path. Conversely, a low TAC/EFH ratio is generally correlated with an operator that is using engines in a manner consistent with accumulating significantly more hot time and distress on components. Therefore, the use of this ratio may be critical in determining severity factors for Weibull distribution shifts, sub-fleeting an operator, and appropriately aging installed hardware within a given work-scoping tool.

One indicator that may be used with the exemplary embodiments is the engine serial number (ESN). Each engine has a unique serial number that may be used to personalize individual assets and index their configuration and usage history records. Other engine identifier may also be used without departing from the scope of the present disclosure.

Cumulative damage models (CDMs) may also be used with the exemplary embodiments. These are component level models that correlate various distress modes to usage. An example of this would be the expected amount of coating spallation to occur with the passage of a certain number of thermal cycles or accumulated exposure above a certain temperature. Cumulative damage models can be used in addition to Weibull curves of components to increase the fidelity of failure predictions. Weibull curves generally include all distress modes where a CDM may be tailored to a single mode. Multiple CDMs can exist for a single component and can be used in conjunction or in place of the overall component Weibull curve.

FIG. 1 illustrates an exemplary sub-system 100 that may be part of a prognostic analytics system according to an embodiment. The sub-system 100 includes an individual component prognostic system 110 that is configured to provide information predictive of a component's failure and/or need for replacement and/or maintenance. For example, and not by limitation, the component may be an engine, such as an aircraft jet engine. The sub-system 100 includes an input/output module (I/O module 114) that is configured to fetch and ingest a wide variety of input data. For example, the input data may include fleet data 104 and single engine data 120; the latter may include single engine performance data 106 and single-engine configuration data 108. Once ingested, the single engine data 120 and the fleet data 104 may be analyzed utilizing application-specific instructions located in a forecast module 112 of a processor 102. The instructions may be fetched by a core 116 of the processor 102 from the forecast module 112, which configures the processor 102 as an application-specific computing device capable of providing prognostic analytic information relating to a single engine. This information may be outputted by the individual component prognostic system 110 as the recommendations 118.

In one embodiment the fleet data 104 may include statistical parameters pertaining to a fleet of engines like the single engine whose single engine data 120 is provided to the individual component prognostic system 110. For example, in one embodiment, the fleet data 104 may include Weibull distributions pertaining to the reliability of the fleet of engines. The fleet data 104 may include performance data and configuration data pertaining to a plurality of engines. Performance data herein, for the single engine or for the fleet of engines, may include, without limitation, cycle data, hours of operation, operating temperature. Furthermore, configuration data, without limitation, may include voltage or current parameters or any other configuration parameters associated with an engine.

Figure 2:
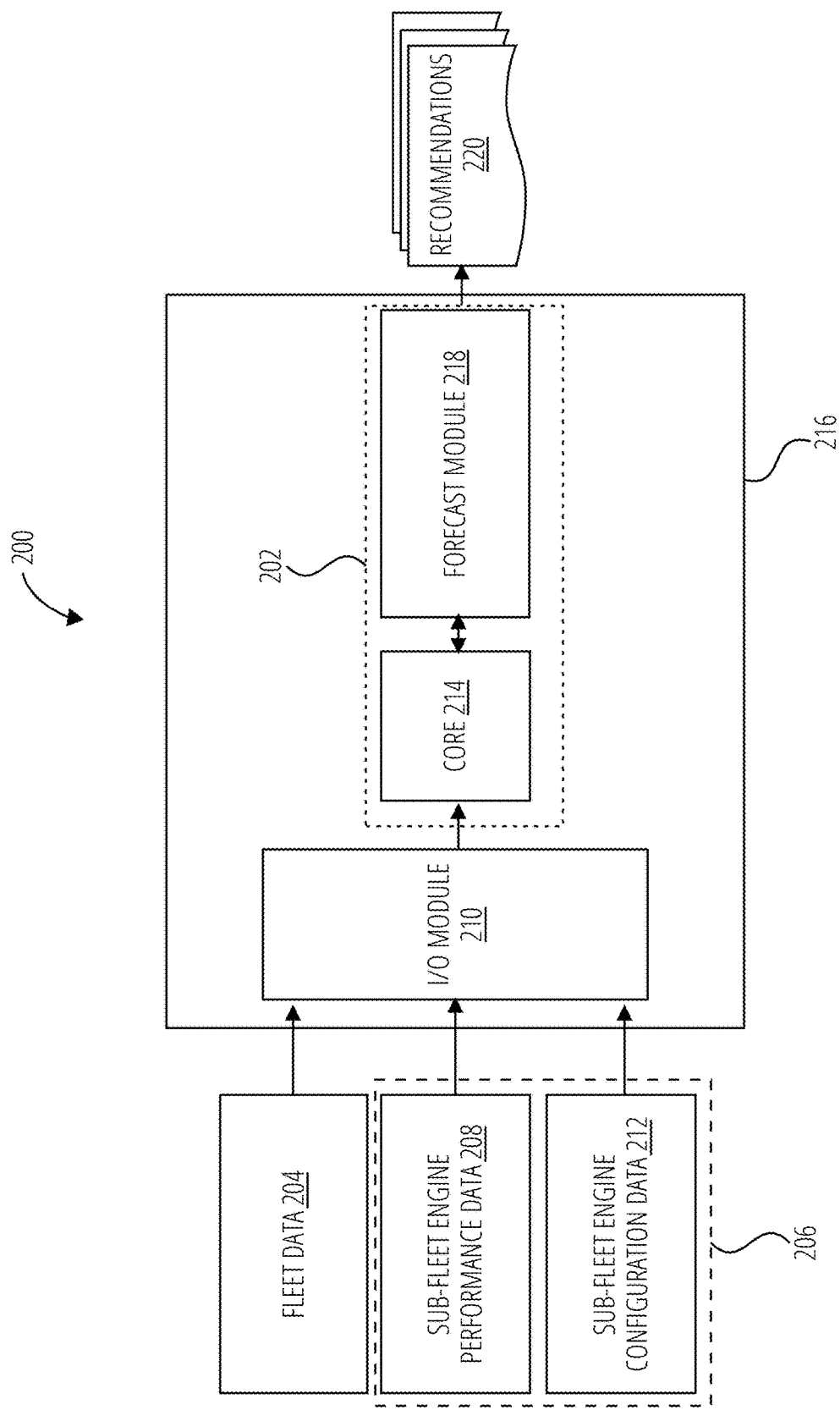
FIG. 2 illustrates a sub-system in accordance with one embodiment.

FIG. 2 illustrates yet another exemplary sub-system 200 that may be part of a prognostic analytics system according to an embodiment. The sub-system 200 includes a sub-fleet component prognostic system 216 that is configured to provide information predictive of the failure and/or need for replacement and/or maintenance for a plurality of components associated with a sub-fleet, which may be herein a subset of components from a set of components forming a fleet of components. For example, and not by limitation, a sub-fleet may include a plurality of jet engines which form a sub-set of yet a greater plurality of jet engines. In some implementation, without loss of generality, the sub-fleet may be the entire fleet of engines rather than a smaller subset of it.

The sub-system 200 includes an input/output module (I/O module 210) that is configured to fetch and ingest a wide variety of input data. For example, the input data may include fleet data 204 and sub-fleet engine data 206; the latter may include sub-fleet engine performance data 208 and sub-fleet engine configuration data 212. Once ingested, the sub-fleet engine data 206 and the fleet data 204 may be analyzed utilizing application-specific instructions located in a forecast module 218 of a processor 202. The instructions may be fetched by a core 214 of the processor 202 from the forecast module 218, which configures the processor 202 as an application-specific computing device capable of providing prognostic analytic information relating to a plurality of engines. This information may be outputted by the sub-fleet component prognostic system 216 as the recommendations 220.

In one embodiment the fleet data 204 may include statistical parameters pertaining to a fleet of engines. For example, in one embodiment, the fleet data 204 may include Weibull distributions pertaining to the reliability of the fleet of engines. Furthermore, the fleet data 204 may include performance data and configuration data pertaining to a plurality of engines. Similarly, the sub-fleet engine data 206 may include performance and configuration data pertaining to a sub-set of the plurality of engines forming the fleet, i.e. pertaining to a sub-fleet.

Together, the sub-system 100 and the sub-system 200 may be part of a prognostic system capable of rendering preemptive and predictive analytics pertaining respectively to a single engine and to a sub-fleet of engines. In one exemplary implementation, the sub-system 100 and the sub-system 200 may be co-located or co-integrated onto a single platform. In yet another exemplary implementation, the sub-system 100 and the sub-system 200 may be remote from one another but still be part of the greater prognostic system.

Figure 3:
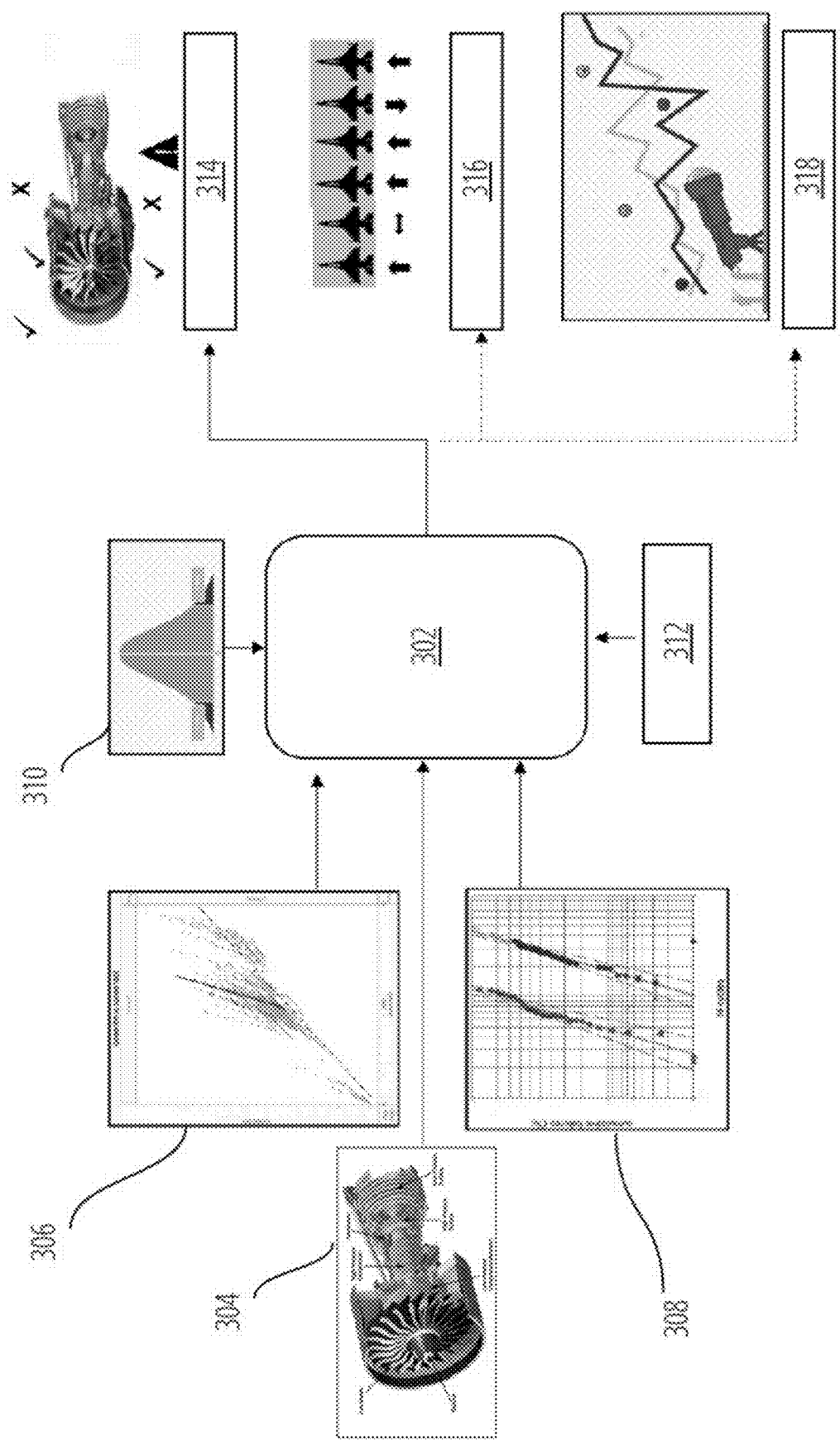
FIG. 3 illustrates a use case in accordance with one embodiment.

FIG. 3 illustrates a use case 300 of a prognostic system 302. In one exemplary implementation, the prognostic system 302 may include the sub-system 100 and the sub-system 200. The latter may be configured to perform sub-fleet analysis and fleet analysis as explained above. In the use case 300, the prognostic system 302 may receive engine build configuration 304 pertaining to a single engine. Further, the prognostic system 302 may receive utilization history 306, which may be, generally, data that indicative of engine utilization. Furthermore, the prognostic system 302 may receive probabilistic models and trend analytics 308 pertaining to the single engine or to a fleet or sub-fleet of engines, depending on whether it is configured to operate in single engine mode, fleet mode, or sub-fleet mode.

The prognostic system 302 may further receive input 310 and input 312. The input 310 may include an allowable fallout risk in the form of a factor following a predetermined probability distribution. The input 312 may include target hours or the scheduled time for a next visit to the shop.

When configured in single-engine mode, the prognostic system 302 outputs a single engine work-scope recommendation for the asset 314, which can include a list of engine components that are flagged as needing maintenance or replacement (marked with an "X" in FIG. 3) and a list of engine components that need no maintenance or replacement. It is noted that the flagged components may be performing well at the time of analysis and that the recommendation is merely predictive of an anticipated failure based on the various data inputted in the prognostic system 302. Similarly, when configured in sub-fleet mode, the prognostic system 302 may output a sub-fleet mode recommendation 316, which may include a probabilistic fallout view for an upcoming deployment of a subset of aircrafts in a fleet. Lastly, when configured in fleet mode, the prognostic system 302 outputs a fleet work scope recommendation 318 that includes part demand forecasting for the entire fleet.

Figure 4:
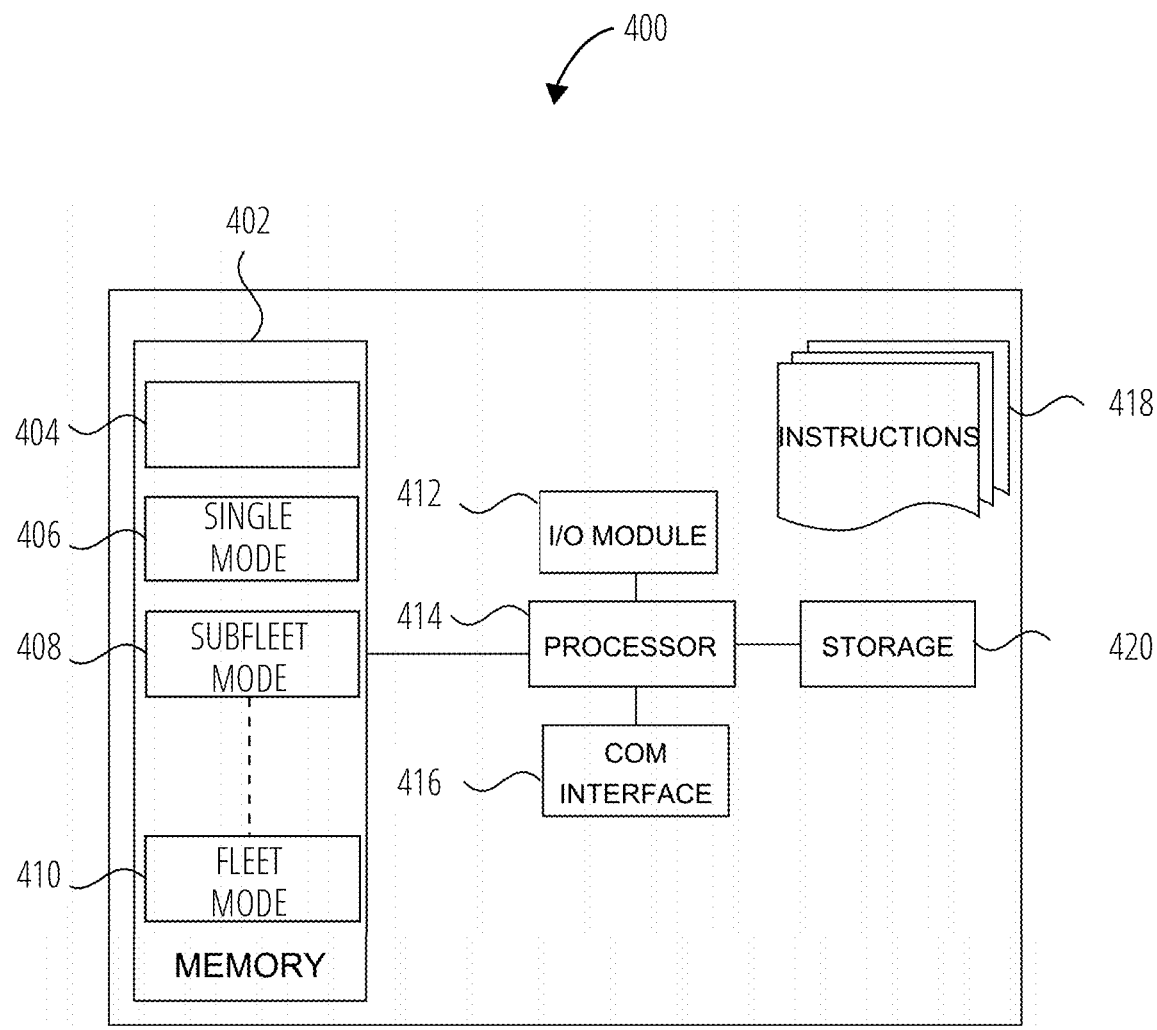
FIG. 4 illustrates a system in accordance with one embodiment.

FIG. 4 depicts a prognostic system 400 that includes an application-specific processor 414 configured to perform tasks specific to reliability monitoring of industrial or military assets, where the tasks include the generation of pre-emptive recommendations for at least one of a single component, a sub-fleet of components, and a fleet of component. The processor 414 has a specific structure imparted by instructions stored in a memory 402 and/or by instructions 418 that can be fetched by the processor 414 from a storage 420. The storage 420 may be co-located with the processor 414, or it may be located elsewhere and be communicatively coupled to the processor 414 via a communication interface 416, for example.

The system 400 can be a stand-alone programmable system, or it can be a programmable module located in a much larger system. For example, the system 400 can be part of a distributed reliability monitoring systems configured to manage several fleets of industrial or military assets. The processor 414 may include one or more hardware and/or software components configured to fetch, decode, execute, store, analyze, distribute, evaluate, and/or categorize information. Furthermore, the processor 414 can include an input/output module (I/O module 412) that can be configured to ingest data pertaining to single assets or fleets of assets. The processor 414 may include one or more processing devices or cores (not shown). In some embodiments, the processor 414 may be a plurality of processors, each having either one or more cores. The processor 414 can be configured to execute instructions fetched from the memory 402, i.e. from one of memory block 404, memory block 406, memory block 408, and memory block 410.

Furthermore, without loss of generality, the storage 420 and/or the memory 402 may include a volatile or non-volatile, magnetic, semiconductor, tape, optical, removable, non-removable, read-only, random-access, or any type of non-transitory computer-readable computer medium. The storage 420 and/or the memory 402 may include programs and/or other information that may be used by the processor 414 to perform tasks consistent with those described herein. For example, the processor 414 may be configured by instructions from the memory block 406, the memory block 408, and the memory block 410, to perform operations yielding preemptive single-engine work scope recommendations, sub-fleet work scope recommendations, and fleet work scope recommendations, respectively. Furthermore, the storage 420 may be configured to log data processed, recorded, or collected during the operation of the processor 414. The data may be time-stamped, location-stamped, cataloged, indexed, or organized in a variety of ways consistent with data storage practice.

Generally, the exemplary embodiments described herein may utilize a fleet's ETDS data feed to determine usage and configuration by an ESN. In one exemplary implementation, an embodiment may include software and hardware components that reside at a ground station that can communicate with the ETDS system and engine data download devices. Furthermore, an embodiment may include hardware and software means configured to fetch additional information from other remotely communicatively coupled systems. For example, an embodiment may fetch Weibull data distributions pertaining to critical parts. These data are defined both in terms of engine operating hours and cycles, and they can be obtained from an engine manufacturer's servers. In one example use case, once an engine is inducted into a shop, an embodiment may be used to run the most up-to-date usage data for that ESN against its fleet Weibull data.

Furthermore, current technical data govern the work scope around the primary reason for removal or UER driver. As such, in the exemplary embodiment, modified technical data will be available whereby with the aid of an embodiment, additional, pre-emptive part recommendations can be defined for a given range of customer inputs. These inputs may include a forecast period in flight hour time and a confidence level to avoid another UER prior to engine overhaul.

The exemplary embodiments are advantageous for military engines that may have several shop visits prior to an interval overhaul, but they can also be used in commercial enterprise applications where the same constraints exist. Furthermore, pre-emptive replacement of parts by competing Weibull distributions based on usage will help extend time-on-wing or the interval to the next unscheduled engine removal. An embodiment may be configured to compare several Weibull distributions for the same part depending upon the distress driver or failure mode. As additional digital twin models in the form of cumulative damage models are created, they can also be added to the embodiments as an input to compare and contrast additional failure scenarios.

When run in 'fleet mode', and embodiment may be set up to run every engine in a fleet assuming each had a UER, and the embodiment may project what parts would be demanded over a defined interval at the input terminal. As an example, if a customer wanted a year out parts forecast, that interval would be defined in fleet mode. In sub-fleet mode, the embodiment can be configured to determine the likelihood of a group of engines to successfully complete a deployment of specified duration. When run prior to a deployment, engines with a high likelihood of distress driving an unscheduled engine removal could be identified and replaced prior to deployment.

As such, an embodiment enables a customer to better manage their engine fleet by extending time on wing through better work scope and pre-emptive part replacement based on asset usage. The embodiment can be used to forecast part demands and provide a probabilistic view of which fleet assets are best suited to deploy. Within a part that has several Weibull or CDMs associated with it, the embodiment can perform a minimum selection to recommend parts for pre-emptive removal.

For components in the hot section flow path of an engine, mission severity analysis factors are used to debit or credit Weibull curves based on the types of missions flown. Hot time debits are assigned when a ratio of total accumulated cycles and engine flight hours is low. Flight hours that are accumulated with the low TAC/EFH ratio are treated as more severe and shift the Weibull curve to the left. Thresholds to use to shift Weibull curves and determine relative severity may be inputted to an exemplary prognostic system, along with the other inputs described above.

Generally, the exemplary systems described herein may be programmed to personalize aging models for the bill of material that comprises a jet engine. The personalization is based on how the engine was used and maintained. The recommendations that are outputted by the system may include a list of parts when run in single engine work-scope mode. This list of parts may be considered for pre-emptive removal based on probabilistic Weibull curves and any resident CDM(s) of those components. Furthermore, the exemplary systems may be configured to house over a hundred different Weibull curves and CDMs, which may be updated as models are refined or new distress modes are uncovered and models for them are developed.

The recommended preemptive removal list may be tailored based on customer input. The customer can input an acceptable level of risk, which in this case is the probability curve piece; and a target build quality. For example, the customer could say that they wanted an overhaul that would last 400 flight hours or one that could last 1200 flight hours. As such, the exemplary system would indicate that many more parts will be recommended for removal for the 1200-hour interval relative to the 400-hour time frame.

The aforementioned sub-fleet mode may be used when a customer is planning to deploy a predetermined number of assets. Many militaries worldwide will deploy a subset of assets to perform a mission for a short period of time from a remote location. Typically, when this scenario occurs, the duration of the deployment is known; for example, it may be known ahead of time that the deployment will require 200 flight hours over 4 months. Customers generally do not want the logistical issues associated with major maintenance evolutions when aircraft are deployed away from their home base. As such, in the sub-fleet mode, the exemplary system is intended to 'fly forward' some number of user defined hours on a user defined subset of engines to determine a probability of a UER during the deployment. Thus, the exemplary system helps the customer determine what the best engines to send are.

Furthermore, the fleet mode may be used for part forecasting. Specifically, the exemplary system may be set up so as to assume that every asset comes in for an overhaul at a given time. For example, assuming all assets are then scheduled to 'fly forward' 400 hours, a preliminary list of parts needed for each engine may be output. This part list may then be used as a forecast.

Those skilled in the relevant art(s) will appreciate that various adaptations and modifications of the embodiments described above can be configured without departing from the scope and spirit of the disclosure. Therefore, it is to be understood that, within the scope of the appended claims, the teachings featured herein may be practiced other than as specifically described herein.

What is claimed is:

1. A system for monitoring a reliability of a fleet of assets, the system comprising:
 a processor comprising a forecast module, the forecast module including application-specific instructions that are utilized for analysis of data being received from the fleet of assets;
  wherein the processor is configured as an application-specific computing device when the data being received from the fleet of assets is analyzed;
 a memory including instructions that, when executed by the processor, cause the processor to perform operations including:
 establishing a communicative coupling between the system and a fleet source server configured to receive an engine tracking database system (ETDS) data feed, wherein the data feed comprises input data including:
  (i) performance data relating to a component;
  (ii) configuration data relating to the component;
  (iii) statistical data relating to a plurality of assets;
 providing a pre-emptive recommendation for the component based on the input data,
  wherein the system is selectively configurable to operate in any of:
   a single component mode, a sub-fleet mode, or a fleet mode;
  wherein, in the single component mode, the system is configured to monitor a reliability of a single component, within the fleet of assets;
  wherein, in the sub-fleet mode, the system is configured to monitor a reliability of a subset of assets of the fleet of assets; and
  wherein, in the fleet mode, the system is configured to monitor a reliability of the fleet of assets.

2. The system of claim 1, wherein the pre-emptive recommendation includes a list of subcomponents for which replacement is suggested.

3. The system of claim 1, wherein in the fleet mode, the pre-emptive recommendation includes an indication of which asset from the fleet of assets is best suited for deployment.

4. The system of claim 1, wherein the statistical data include a Weibull distribution.

5. The system of claim 1, wherein the statistical data include probabilistic models.

6. The system of claim 1, wherein the statistical data include trend analytics.

7. The system of claim 2, wherein the input data include engine build configuration.

8. The system of claim 1, wherein the input data include at least one metric comprising a ratio of total accumulated cycles over engine flight hours (TAC/EFH).

9. The system of claim 1, wherein the input data includes an allowable fallout risk.

10. A system for monitoring a reliability of a subset of assets of a fleet of assets, the system comprising:
- a processor comprising a forecast module, the forecast module including application-specific instructions that are utilized for analysis of data being received from the subset of assets of the fleet of assets;
  - wherein the processor is configured as an application-specific computing device when the data being received from the fleet of assets is analyzed;
- a memory including instructions that, when executed by the processor, cause the processor to perform operations including:
- establishing a communicatively coupling between the system and a fleet source server configured to receive an engine tracking database system (ETDS) data feed, wherein the data feed comprises input data including:
  - (i) performance data relating to a set of components from assets in the subset of assets;
  - (ii) configuration data relating to the set of components;
  - (iii) statistical data relating to the fleet of assets;
- providing a pre-emptive recommendation for the set of components based on the input data,
  - wherein the system is selectively configurable to operate in any of:
    - a single component mode, a sub-fleet mode, or a fleet mode;
  - wherein, in the single component mode, the system is configured to monitor a reliability of a single component, within the fleet of assets;
  - wherein, in the sub-fleet mode, the system is configured to monitor a reliability of the subset of assets of the fleet of assets; and
  - wherein, in the fleet mode, the system is configured to monitor a reliability of the fleet of assets.

11. The system of claim 10, wherein in the fleet mode, the pre-emptive recommendation includes an indication of which asset from the fleet of assets is best suited for deployment.

12. The system of claim 10, the statistical data include a Weibull distribution.

13. The system of claim 10, wherein the statistical data include probabilistic models.

14. The system of claim 10, wherein the statistical data include trend analytics.

15. The system of claim 10, wherein the pre-emptive recommendation includes indicating whether a group of engines may successfully complete a deployment of specified duration.

16. The system of claim 10, wherein the input data further includes a duration of employment.

17. A system for monitoring a reliability of a fleet of assets, the system comprising:
- a processor comprising a forecast module, the forecast module including application-specific instructions that are utilized for analysis of data being received from the fleet of assets;
  - wherein the processor is configured as an application-specific computing device when the data being received from the fleet of assets is analyzed;
- a memory including instructions that, when executed by the processor, cause the processor to perform operations including:
- establishing a communicatively coupling between the system and a fleet source server configured to receive an engine tracking database system (ETDS) data feed, wherein the data feed comprises input data including:
  - (i) performance data relating the fleet of assets;
  - (ii) configuration data relating to the fleet of assets;
  - (iii) statistical data relating to the fleet of assets;
- providing a pre-emptive recommendation for the fleet of assets based on the input data,
  - wherein the system is selectively configurable to operate in any of:
    - a single component mode, a sub-fleet mode, or a fleet mode;
  - wherein, in the single component mode, the system is configured to monitor a reliability of a single component, within the fleet of assets;
  - wherein, in the sub-fleet mode, the system is configured to monitor a reliability of a subset of assets of the fleet of assets; and
- wherein, in the fleet mode, the system is configured to monitor a reliability of the fleet of assets.

18. The system of claim 17, wherein in the fleet mode, the pre-emptive recommendation includes an indication of which asset from the fleet of assets is best suited for deployment.

19. The system of claim 17, wherein the pre-emptive recommendation includes a part demand for the fleet of assets.

20. The system of claim 17, wherein the pre-emptive recommendation includes an indication of which asset from the fleet of assets is best suited for deployment.

* * * * *